(12) United States Patent
Marlett

(10) Patent No.: US 10,517,428 B2
(45) Date of Patent: Dec. 31, 2019

(54) GRILLING ASSEMBLY

(71) Applicant: Nathan Marlett, Clear Lake, WI (US)

(72) Inventor: Nathan Marlett, Clear Lake, WI (US)

( * ) Notice: Subject to any disclaimer, the term of this patent is extended or adjusted under 35 U.S.C. 154(b) by 346 days.

(21) Appl. No.: 15/463,782

(22) Filed: Mar. 20, 2017

(65) Prior Publication Data
US 2018/0263416 A1 Sep. 20, 2018

(51) Int. Cl.
A47J 37/00 (2006.01)
A47J 37/07 (2006.01)
A47J 37/04 (2006.01)

(52) U.S. Cl.
CPC ......... A47J 37/0745 (2013.01); A47J 37/043 (2013.01); A47J 2037/0777 (2013.01); A47J 2037/0795 (2013.01)

(58) Field of Classification Search
CPC .................. A47J 37/043; A47J 37/0745; A47J 2037/0777; A47J 2037/0795
USPC ..... 99/450, 421 A, 393; 126/30, 25 R, 25 A, 126/25 AA
See application file for complete search history.

(56) References Cited

U.S. PATENT DOCUMENTS

| 686,849 | A |  | 11/1901 | Hausmann |  |
|---|---|---|---|---|---|
| 1,670,029 | A | * | 5/1928 | Fetter | A22B 5/06 |
|  |  |  |  |  | 248/164 |
| 4,120,280 | A |  | 10/1978 | Iverson et al. |  |
| 4,269,164 | A |  | 5/1981 | Van Grinsven et al. |  |
| 4,732,138 | A |  | 3/1988 | Vos |  |
| 5,025,715 | A | * | 6/1991 | Sir | A47J 33/00 |
|  |  |  |  |  | 126/30 |
| D337,933 | S |  | 8/1993 | Gryz |  |
| 5,297,534 | A | * | 3/1994 | Louden | A47J 37/0763 |
|  |  |  |  |  | 126/25 A |
| 5,908,026 | A | * | 6/1999 | Forst | A47J 37/0763 |
|  |  |  |  |  | 126/25 AA |
| 5,944,008 | A |  | 8/1999 | Winkel |  |
| 6,711,993 | B2 | * | 3/2004 | Robertson | A47J 33/00 |
|  |  |  |  |  | 126/25 A |
| 7,063,006 | B1 | * | 6/2006 | Spehle | A47J 33/00 |
|  |  |  |  |  | 126/25 A |
| 7,707,928 | B1 | * | 5/2010 | Kamps | A47J 37/043 |
|  |  |  |  |  | 126/25 AA |
| 2008/0283031 | A1 |  | 11/2008 | Korab |  |

FOREIGN PATENT DOCUMENTS

CH 665946 A5 * 6/1988 .......... A47J 37/0745

* cited by examiner

Primary Examiner — Reginald Alexander

(57) ABSTRACT

A grilling assembly for grilling over an open flame includes a frame that is tripoidal. A shaft is rotationally coupled by a first end to the frame. The shaft extends from proximate to an apex of the frame toward a base of the frame. A power module and a motor are coupled to the frame. The motor is operationally coupled to the power module and the shaft. The motor is positioned to rotate the shaft. A grate is coupled to a second end of the shaft. The grate is configured to position substantially horizontally over an open flame, such as a campfire. The grate is positioned to rotate coincident with the shaft such that food items that are positioned on the grate are positioned to be heated by the open flame.

12 Claims, 4 Drawing Sheets

GRILLING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to grilling assemblies and more particularly pertains to a new grilling assembly for grilling over an open flame.

BRIEF SUMMARY OF THE INVENTION

An embodiment of the disclosure meets the needs presented above by generally comprising a frame that is tripoidal. A shaft is rotationally coupled by a first end to the frame. The shaft extends from proximate to an apex of the frame toward a base of the frame. A power module and a motor are coupled to the frame. The motor is operationally coupled to the power module and the shaft. The motor is positioned to rotate the shaft. A grate is coupled to a second end of the shaft. The grate is configured to position substantially horizontally over an open flame, such as a campfire. The grate is positioned to rotate coincident with the shaft such that food items that are positioned on the grate are positioned to be heated by the open flame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
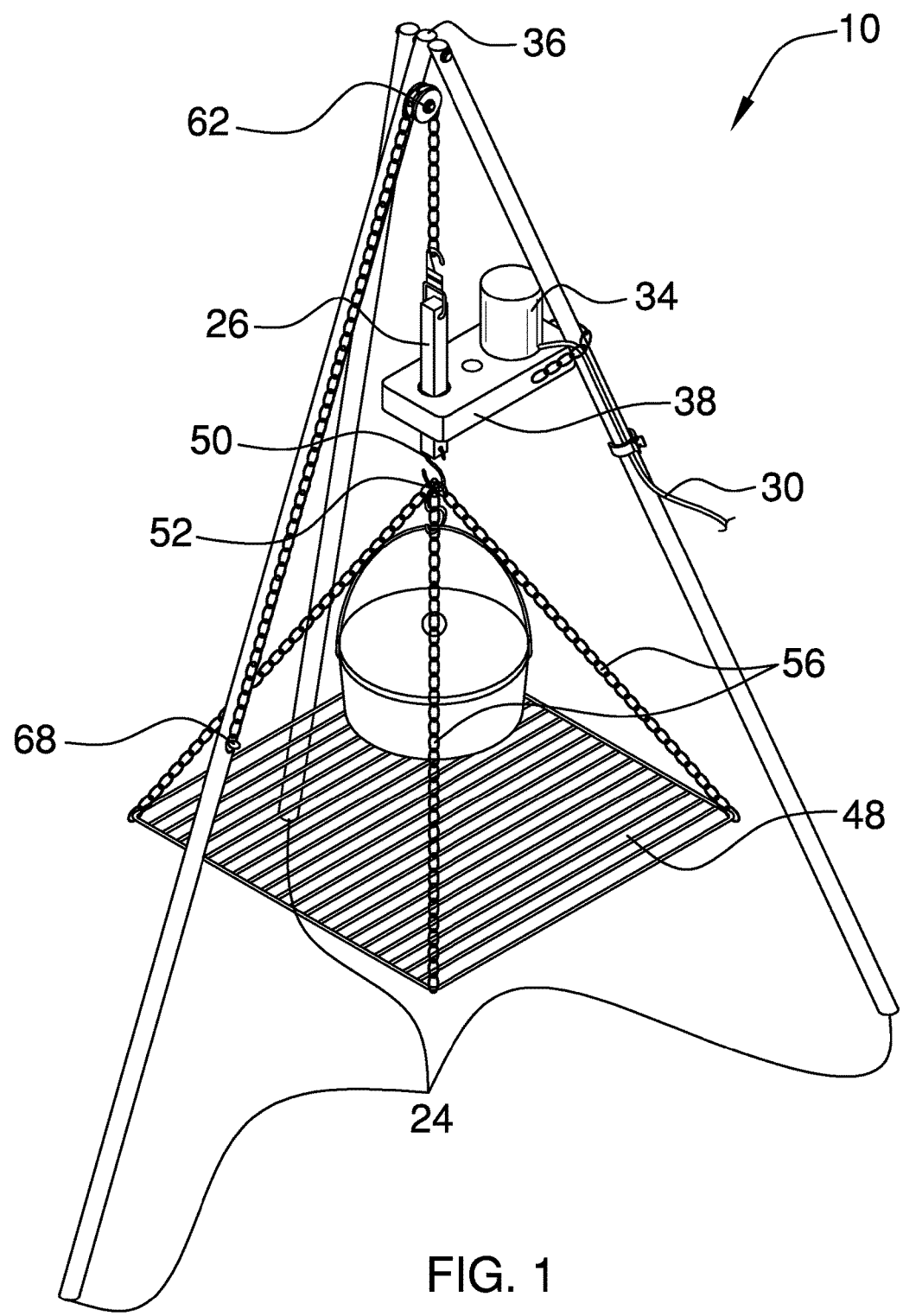
FIG. 1 is an isometric perspective view of a grilling assembly according to an embodiment of the disclosure.
Figure 2:
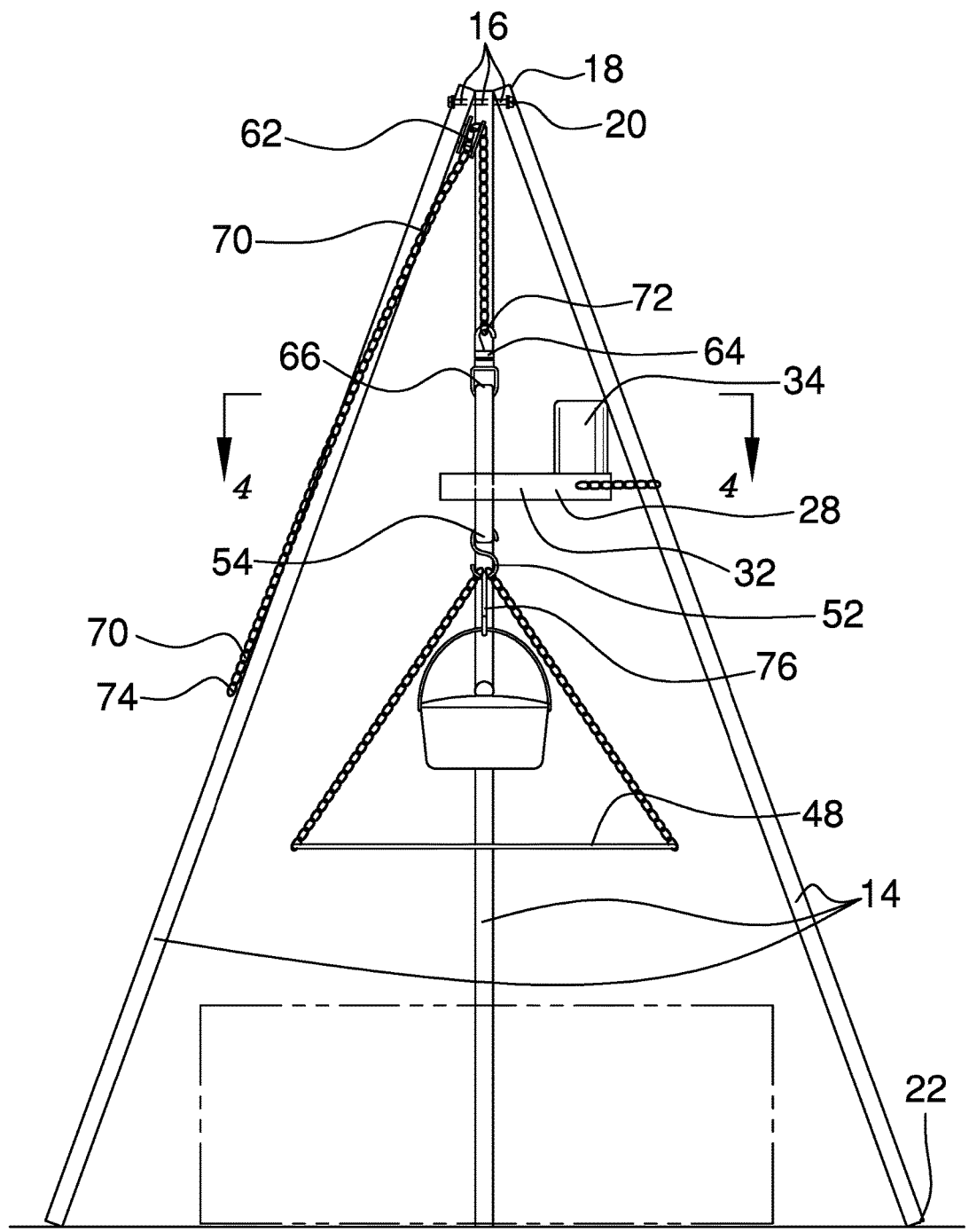
FIG. 2 is a front view of an embodiment of the disclosure.
Figure 3:
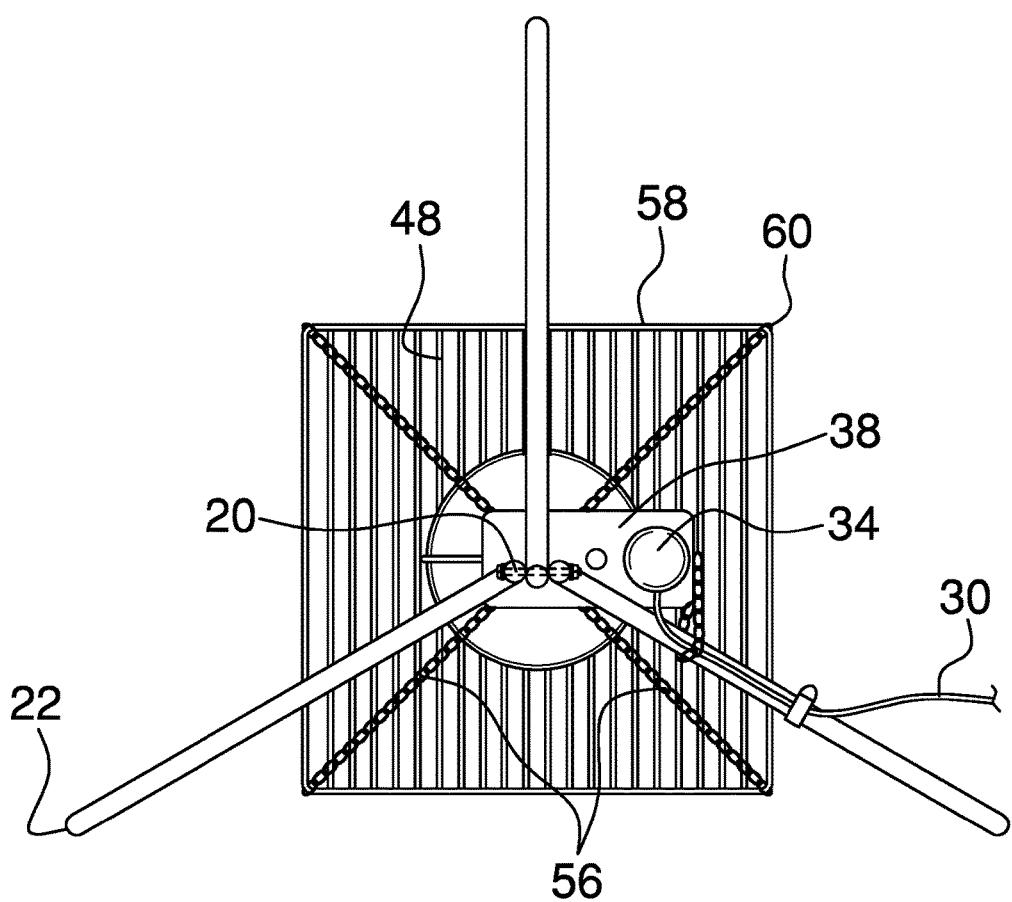
FIG. 3 is a top view of an embodiment of the disclosure.
Figure 4:
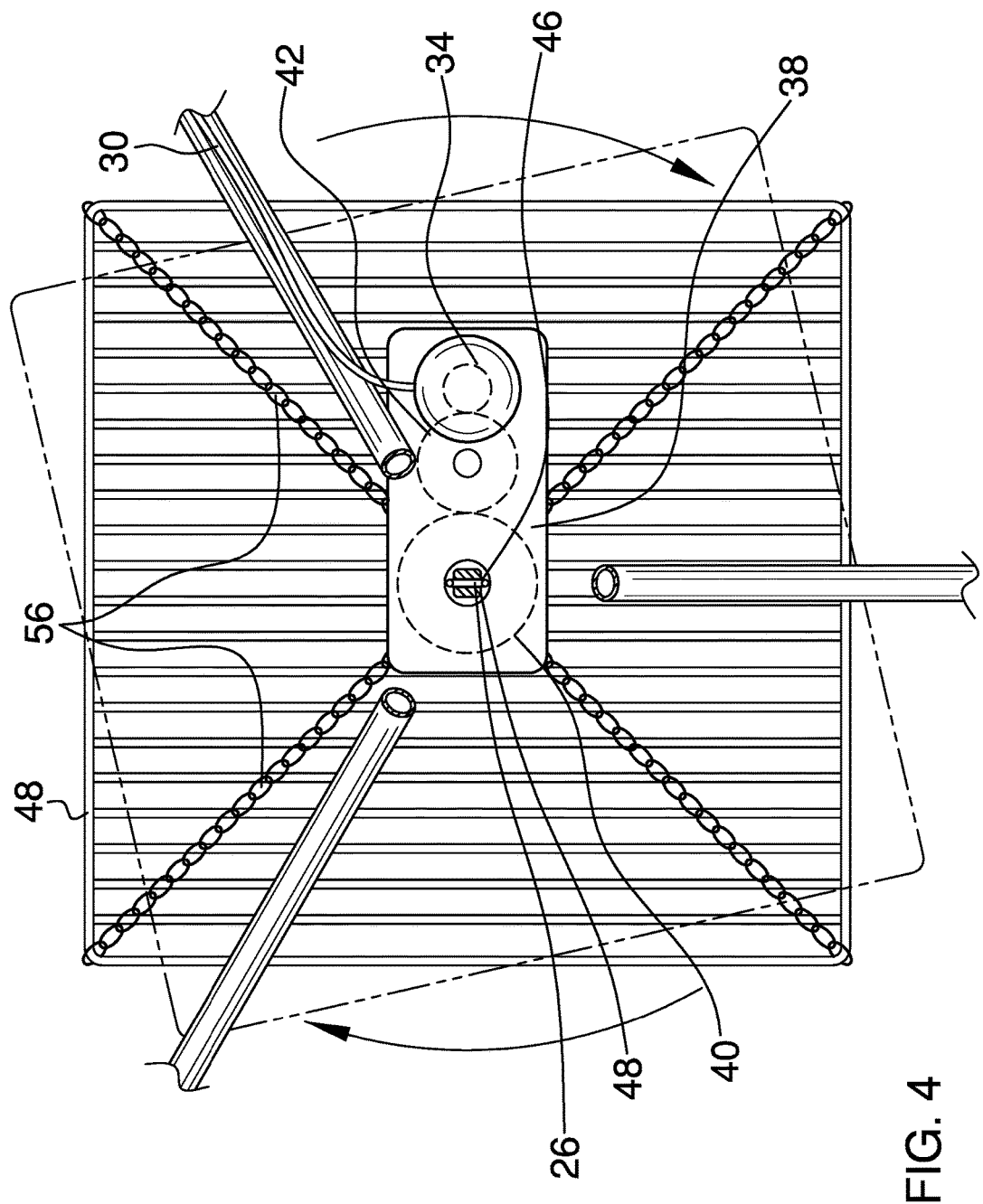
FIG. 4 is a cross-sectional view of an embodiment of the disclosure.

With reference now to the drawings, and in particular to FIGS. 1 through 4 thereof, a new grilling assembly embodying the principles and concepts of an embodiment of the disclosure and generally designated by the reference numeral 10 will be described.

As best illustrated in FIGS. 1 through 4, the grilling assembly 10 generally comprises a frame 12 that is tripoidal. In one embodiment, the frame 12 comprises a set of three rods 14. Each of a set of three holes 16 is positioned through a respective rod 14 proximate to a top 18 of the respective rod 14. An axle 20 is positioned through the set of three holes 16 such that each of the rods 14 is rotationally coupled to the axle 20. The rods 14 are configured to rotate such that bottoms 22 of the rods 14 are positioned to define a base 24 of the frame 12. The base 24 is substantially triangularly shaped.

A shaft 26 is rotationally coupled by a first end 66 to the frame 12. The shaft 26 extends from proximate to an apex 36 of the frame 12 toward a base 24 of the frame 12. In one embodiment, the shaft 26 is squarely shaped when viewed longitudinally.

A power module 28 is coupled to the frame 12. In one embodiment, the power module 28 comprises a cord 30. The cord 30 is configured to couple to a source of alternating current. In another embodiment, the power module 28 comprises at least one battery 32. In yet another embodiment, the at least one battery 32 is rechargeable.

A motor 34 is coupled to the frame 12. The motor 34 is operationally coupled to the power module 28 and the shaft 26. The motor 34 is positioned to rotate the shaft 26. In one embodiment, the motor 34 is slidably coupled to the frame 12 so that the motor 34 is selectively positionable between the apex 36 and the base 24 of the frame 12.

A gearbox 38 is coupled to and extends from the motor 34. A cogwheel 40 and a meshing gear 42 are positioned in the gearbox 38. The meshing gear 42 is gearedly coupled to the motor 34. The cogwheel 40 is gearedly coupled to the meshing gear 42. An opening 44 is axially positioned through the cogwheel 40. The opening 44 is complementary to the shaft 26. A channel 46 is positioned through the gearbox 38. The channel 46 is aligned with the opening 44. The channel 46 is positioned to insert the shaft 26 through the opening 44 so that the shaft 26 is slidably coupled to the cogwheel 40 to position the motor 34 to rotate the shaft 26.

A grate 48 is coupled to a second end 50 of the shaft 26. The grate 48 is configured to position substantially horizontally over an open flame, such as a campfire. The grate 48 is positioned to rotate coincident with the shaft 26 such that food items that are positioned on the grate 48 are positioned to be heated by the open flame. In one embodiment, the grate 48 is substantially squarely shaped.

A first hook 52, which is S-shaped, is positioned to insert into a penetration 54 that is positioned through the shaft 26 proximate to the second end 50. The first hook 52 is positioned to rotate coincident with the shaft 26. Each of a plurality of first chains 56 is coupled to and extends between the first hook 52 and a perimeter 58 of the grate 48. The first chains 56 are positioned to suspend the grate 48 substantially horizontally over the open flame, such as the campfire. The grate 48 is positioned to rotate coincident with the shaft 26. The food items that are positioned on the grate 48 are positioned to be heated by the open flame. In one embodiment, the plurality of first chains 56 comprises four first chains 56 that extend singly from proximate to each corner 60 of the grate 48.

A pulley 62 is coupled to the frame 12 proximate to the apex 36. A second hook 64 is rotationally coupled to and extends from the first end 66 of the shaft 26. A pin 68 is coupled to and extends from the frame 12. The pin 68 is positioned substantially equally distant from the apex 36 and the base 24. A second chain 70 is positioned over the pulley 62. The second chain 70 has a second terminus 72 that is coupled to the second hook 64. The second chain 70 is selectively couplable to the pin 68 between the second terminus 72 and a first terminus 74 of the second chain 70 so that the second terminus 72 of the second chain 70 is variably positionable relative to the apex 36. The second chain 70 is configured to selectively raise and lower the grate 48 so that the grate 48 is selectively positionable relative to the open flame.

A third hook 76, which is S-shaped, is selectively couplable to the first hook 52. The third hook 76 extends toward the base 24 of the frame 12. The third hook 76 is configured to couple to an item of grilling cookware, such as a pot, to position the item of grilling cookware over the open flame.

In use, the rods 14 that are positioned on the axle 20 are configured to rotate such that the bottoms 22 of the rods 14 define the base 24 of the frame 12. The channel 46 that is positioned through the gearbox 38 is positioned to insert the shaft 26 through the opening 44 in the cogwheel 40. The shaft 26 is slidably coupled to the cogwheel 40 so that the motor 34 is positioned to rotate the shaft 26. The first hook 52 that is positioned on the shaft 26 is positioned to rotate coincident with the shaft 26. The first chains 56 are positioned to suspend the grate 48 substantially horizontally over the open flame, such as the campfire. The grate 48 is positioned to rotate coincident with the shaft 26. The food items that are positioned on the grate 48 are positioned to be heated by the open flame. The second chain 70 that is positioned on the pulley 62 is configured to selectively raise and lower the grate 48 so that the grate 48 is selectively positionable relative to the open flame. The third hook 76 is configured to couple to an item of grilling cookware, such as a pot, to position the item of grilling cookware over the open flame.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grilling assembly comprising:
   a frame, said frame being tripoidal;
   a shaft rotationally coupled by a first end to said frame, said shaft extending from proximate to an apex of said frame toward a base of said frame, said shaft being squarely shaped when viewed longitudinally;
   a power module coupled to said frame;
   a motor coupled to said frame, said motor being operationally coupled to said power module and said shaft;
   a grate coupled to a second end of said shaft;
   wherein said motor is positioned on said frame such that said motor is positioned for rotating said shaft, wherein said grate is positioned on said shaft such that said grate is configured for positioning substantially horizontally over an open flame, such as a campfire, and wherein said grate is positioned for rotating coincident with said shaft such that food items positioned on said grate are positioned for heating by the open flame;
   a gearbox coupled to and extending from said motor;
   a cogwheel and a meshing gear positioned in said gearbox, said meshing gear being gearedly coupled to said motor, said cogwheel being gearedly coupled to said meshing gear;
   an opening axially positioned through said cogwheel, said opening being complementary to said shaft;
   a channel positioned through said gearbox, said channel being aligned with said opening; and
   wherein said channel is positioned through said gearbox such that said channel is positioned for inserting said shaft through said opening such that said shaft is slidably coupled to said cogwheel such that said motor is positioned for rotating said shaft.

2. The assembly of claim 1, further including said frame comprising:
   a set of three rods;
   a set of three holes, each said hole being positioned through a respective said rod proximate to a top of said respective said rod;
   an axle positioned through said set of three holes such that each of said rods is rotationally coupled to said axle; and
   wherein said rods are positioned on said axle such that said rods are configured for rotating such that bottoms of said rods are positioned for defining a base of said frame, said base being substantially triangularly shaped.

3. The assembly of claim 1, further including said power module comprising a cord, said cord being configured for coupling to a source of alternating current.

4. The assembly of claim 1, further including said power module comprising at least one battery.

5. The assembly of claim 4, further including said at least one battery being rechargeable.

6. The assembly of claim 1, further including said motor being slidably coupled to said frame such that said motor is selectively positionable between said apex and said base of said frame.

7. The assembly of claim 1, further including said grate being substantially squarely shaped.

8. The assembly of claim 1, further comprising:
a first hook, said first hook being S-shaped such that said first hook is positioned for inserting into a penetration positioned through said shaft proximate to said second end, wherein said first hook is positioned on said shaft such that said first hook is positioned for rotating coincident with said shaft;
a plurality of first chains, each said first chain being coupled to and extending between said first hook and a perimeter of said grate; and
wherein said first chains are positioned on said first hook and said grate such that said first chains are positioned for suspending said grate substantially horizontally over the open flame, such as the campfire, such that said grate is positioned for rotating coincident with said shaft such that the food items positioned on said grate are positioned for heating by the open flame.

9. The assembly of claim 1, further comprising:
a pulley coupled to said frame proximate to said apex;
a second hook rotationally coupled to and extending from said first end of said shaft;
a pin coupled to and extending from said frame, said pin being positioned substantially equally distant from said apex and said base;
a second chain positioned over said pulley, said second chain having a second terminus coupled to said second hook, said second chain being selectively couplable to said pin between said second terminus and a first terminus of said second chain, such that said second terminus of said second chain is variably positionable relative to said apex; and
wherein said second chain is positioned on said pulley such that said second chain is configured for selectively raising and lowering said grate such that said grate is selectively positionable relative to the open flame.

10. The assembly of claim 1, further comprising:
said frame comprising:
  a set of three rods,
  a set of three holes, each said hole being positioned through a respective said rod proximate to a top of said respective said rod, and
  an axle positioned through said set of three holes such that each of said rods is rotationally coupled to said axle, wherein said rods are positioned on said axle such that said rods are configured for rotating such that bottoms of said rods are positioned for defining a base of said frame, said base being substantially triangularly shaped;
said power module comprising a cord, said cord being configured for coupling to a source of alternating current, said power module comprising at least one battery, said at least one battery being rechargeable;
said motor being slidably coupled to said frame such that said motor is selectively positionable between said apex and said base of said frame;
said grate being substantially squarely shaped;
a first hook, said first hook being S-shaped such that said first hook is positioned for inserting into a penetration positioned through said shaft proximate to said second end, wherein said first hook is positioned on said shaft such that said first hook is positioned for rotating coincident with said shaft;
a plurality of first chains, each said first chain being coupled to and extending between said first hook and a perimeter of said grate, wherein said first chains are positioned on said first hook and said grate such that said first chains are positioned for suspending said grate substantially horizontally over the open flame, such as the campfire, such that said grate is positioned for rotating coincident with said shaft such that the food items positioned on said grate are positioned for heating by the open flame, said plurality of first chains comprising four said first chains extending singly from proximate to each corner of said grate;
a pulley coupled to said frame proximate to said apex;
a second hook rotationally coupled to and extending from said first end of said shaft;
a pin coupled to and extending from said frame, said pin being positioned substantially equally distant from said apex and said base;
a second chain positioned over said pulley, said second chain having a second terminus coupled to said second hook, said second chain being selectively couplable to said pin between said second terminus and a first terminus of said second chain, such that said second terminus of said second chain is variably positionable relative to said apex, wherein said second chain is positioned on said pulley such that said second chain is configured for selectively raising and lowering said grate such that said grate is selectively positionable relative to the open flame;
a third hook, said third hook being S-shaped, said third hook being selectively couplable to said first hook such that said third hook extends toward said base of said frame, wherein said third hook is positioned on said second hook such that said third hook is configured for coupling to an item of grilling cookware, such as a pot, positioning the item of grilling cookware over the open flame; and
wherein said rods are positioned on said axle such that said rods are configured for rotating such that said bottoms of said rods are positioned for defining said base of said frame, wherein said channel is positioned through said gearbox such that said channel is positioned for inserting said shaft through said opening such that said shaft is slidably coupled to said cogwheel such that said motor is positioned for rotating said shaft, wherein said first hook is positioned on said shaft such that said first hook is positioned for rotating coincident with said shaft, wherein said first chains are positioned on said first hook and said grate such that said first chains are positioned for suspending said grate substantially horizontally over the open flame, such as the campfire, such that said grate is positioned for rotating coincident with said shaft such that the food items positioned on said grate are positioned for heating by the open flame, wherein said second chain is positioned on said pulley such that said second chain is configured for selectively raising and lowering said grate such that said grate is selectively positionable relative to the open flame, wherein said third hook is positioned on said second hook such that said third hook is configured for coupling to an item of grilling cookware, such as a pot, positioning the item of grilling cookware over the open flame.

11. A grilling assembly comprising:
a frame, said frame being tripoidal;
a shaft rotationally coupled by a first end to said frame, said shaft extending from proximate to an apex of said frame toward a base of said frame;
a power module coupled to said frame;
a motor coupled to said frame, said motor being operationally coupled to said power module and said shaft;
a grate coupled to a second end of said shaft;
wherein said motor is positioned on said frame such that said motor is positioned for rotating said shaft, wherein said grate is positioned on said shaft such that said grate is configured for positioning substantially horizontally over an open flame, such as a campfire, and wherein said grate is positioned for rotating coincident with said shaft such that food items positioned on said grate are positioned for heating by the open flame;
a first hook, said first hook being S-shaped such that said first hook is positioned for inserting into a penetration positioned through said shaft proximate to said second end, wherein said first hook is positioned on said shaft such that said first hook is positioned for rotating coincident with said shaft;
a plurality of first chains, each said first chain being coupled to and extending between said first hook and a perimeter of said grate; and
wherein said first chains are positioned on said first hook and said grate such that said first chains are positioned for suspending said grate substantially horizontally over the open flame, such as the campfire, such that said grate is positioned for rotating coincident with said shaft such that the food items positioned on said grate are positioned for heating by the open flame; and
said plurality of first chains comprising four said first chains extending singly from proximate to each corner of said grate.

12. A grilling assembly comprising:
a frame, said frame being tripoidal;
a shaft rotationally coupled by a first end to said frame, said shaft extending from proximate to an apex of said frame toward a base of said frame;
a power module coupled to said frame;
a motor coupled to said frame, said motor being operationally coupled to said power module and said shaft;
a grate coupled to a second end of said shaft;
wherein said motor is positioned on said frame such that said motor is positioned for rotating said shaft, wherein said grate is positioned on said shaft such that said grate is configured for positioning substantially horizontally over an open flame, such as a campfire, and wherein said grate is positioned for rotating coincident with said shaft such that food items positioned on said grate are positioned for heating by the open flame;
a first hook, said first hook being S-shaped such that said first hook is positioned for inserting into a penetration positioned through said shaft proximate to said second end, wherein said first hook is positioned on said shaft such that said first hook is positioned for rotating coincident with said shaft;
a plurality of first chains, each said first chain being coupled to and extending between said first hook and a perimeter of said grate;
wherein said first chains are positioned on said first hook and said grate such that said first chains are positioned for suspending said grate substantially horizontally over the open flame, such as the campfire, such that said grate is positioned for rotating coincident with said shaft such that the food items positioned on said grate are positioned for heating by the open flame;
a second hook rotationally coupled to and extending from said first end of said shaft; and
a third hook, said third hook being S-shaped, said third hook being selectively couplable to said first hook such that said third hook extends toward said base of said frame, wherein said third hook is positioned on said second hook such that said third hook is configured for coupling to an item of grilling cookware, such as a pot, positioning the item of grilling cookware over the open flame.

* * * * *